(12) United States Patent
Bakker

(10) Patent No.: US 9,841,112 B2
(45) Date of Patent: Dec. 12, 2017

(54) THREE-POSITION BOOSTER VALVE MECHANISM HAVING A PISTON-CYLINDER CONTROL SYSTEM WHICH CONNECTS CENTRALLY IN BETWEEN SUPPLY AND EXHAUST VALVES TO AN OPERATING MEMBER

(71) Applicant: Asco Controls B.V., Scherpenzeel (NL)

(72) Inventor: Henk Bakker, Driel (NL)

(73) Assignee: Asco Controls B.V., Scherpenzeel (NL)

( * ) Notice: Subject to any disclaimer, the term of this patent is extended or adjusted under 35 U.S.C. 154(b) by 0 days.

(21) Appl. No.: 15/507,795

(22) PCT Filed: Sep. 10, 2015

(86) PCT No.: PCT/EP2015/070762
§ 371 (c)(1),
(2) Date: Mar. 1, 2017

(87) PCT Pub. No.: WO2016/038162
PCT Pub. Date: Mar. 17, 2016

(65) Prior Publication Data
US 2017/0254424 A1 Sep. 7, 2017

(30) Foreign Application Priority Data

Sep. 10, 2014 (NL) ...................................... 2013449

(51) Int. Cl.
*F15B 13/042* (2006.01)
*F16K 11/16* (2006.01)
(Continued)

(52) U.S. Cl.
CPC ........ *F16K 11/161* (2013.01); *F15B 13/0405* (2013.01); *F16K 27/0263* (2013.01); *F16K 31/1223* (2013.01); *F15B 2013/0412* (2013.01)

(58) Field of Classification Search
CPC ............... F16K 11/161; F16K 31/1223; F16K 27/0263; F15B 13/0405; F15B 2013/0412;
(Continued)

(56) References Cited

U.S. PATENT DOCUMENTS 2,342,770 A * 2/1944 Temple ................... F15B 13/04
137/596.2
2,630,828 A 3/1953 Bent
(Continued)

FOREIGN PATENT DOCUMENTS

| CA | 2537862 A1 | 8/2007 |
|----|------------|--------|
| EP | 1255044 A1 | 11/2002 |
| WO | 8503556 A1 | 8/1985 |

*Primary Examiner* — Minh Le
(74) *Attorney, Agent, or Firm* — Hoffmann & Baron, LLP

(57) ABSTRACT

A three-position booster valve mechanism includes an operating member for moving a supply and exhaust valve. A piston-cylinder control system is provided for moving the operating member between a first position in which the supply and exhaust valve are closed, a second position in which the supply valve is open and the exhaust valve is closed, and a third position in which the supply valve is closed and the exhaust valve is open. A pilot port is provided for moving the operating member in between the first, second and third positions in dependence of a pilot pressure. The piston-cylinder control system connects to the operating member at a central point of application in between the supply and exhaust valve. The operating member extends in opposing directions from the central point of application towards the supply and exhaust valve.

13 Claims, 14 Drawing Sheets

(51) Int. Cl.
*F16K 31/122* (2006.01)
*F16K 27/02* (2006.01)
*F15B 13/04* (2006.01)

(58) Field of Classification Search
CPC ....... Y10T 137/2544; Y10T 137/87169; Y10T 137/87193
USPC ........ 137/596.14, 596, 596.1, 596.13, 596.2, 137/102, 487, 488
See application file for complete search history.

(56) References Cited

U.S. PATENT DOCUMENTS

| | | | | |
|---|---|---|---|---|
| 2,924,200 A | | 2/1960 | Hanna et al. | |
| 3,403,700 A | * | 10/1968 | Meynell | F16K 11/166 137/607 |
| 3,805,840 A | * | 4/1974 | Byers, Jr. | F16K 11/14 137/627.5 |
| 3,868,966 A | * | 3/1975 | Malygin | B30B 15/14 137/596.16 |
| 4,763,691 A | * | 8/1988 | Hahmann | F15B 13/0402 137/596.14 |
| 5,094,260 A | * | 3/1992 | Stuart | G05D 16/202 137/102 |
| 5,606,994 A | * | 3/1997 | Tanikawa | F16K 11/161 137/627.5 |
| 5,682,918 A | * | 11/1997 | Stoll | G05D 16/0663 137/596.18 |
| 8,205,632 B2 | * | 6/2012 | Fishwick | F15B 13/0405 137/102 |
| 8,960,217 B2 | * | 2/2015 | Inagaki | F15B 5/006 137/596.18 |
| 9,062,798 B2 | * | 6/2015 | Neef | F16K 47/04 |
| 9,092,038 B2 | * | 7/2015 | Schuler | F16K 11/161 |
| 9,372,487 B2 | * | 6/2016 | Haller | F15B 11/006 |

* cited by examiner

THREE-POSITION BOOSTER VALVE MECHANISM HAVING A PISTON-CYLINDER CONTROL SYSTEM WHICH CONNECTS CENTRALLY IN BETWEEN SUPPLY AND EXHAUST VALVES TO AN OPERATING MEMBER

CROSS-REFERENCE TO RELATED APPLICATIONS

This application is the National Stage of International Application No. PCT/EP2015/070762 filed Sep. 10, 2015, which claims the benefit of Netherlands Application No. NL 2013449, filed Sep. 10, 2014, the contents of which is incorporated by reference herein.

FIELD OF THE INVENTION

The invention relates to the field of three-position booster valve mechanisms having a quick exhaust option and with a pilot pressure operated control system for moving supply and exhaust valves between open and closed positions. Such three-position booster valve mechanisms for example can be used as volume booster for operating a pneumatic or hydraulic actuator of a large valve positioner in a pipeline.

BACKGROUND OF THE INVENTION

For example EP 1 255 044 shows a three-position booster valve mechanism with a housing inside which a supply valve and an exhaust valve are biased into closed positions. The supply valve is placed inside a supply passage which extends between an inlet port and an outlet port. The exhaust valve is placed inside an exhaust passage which extends between an outlet port and an exhaust port. A stepped stem is provided for moving either the supply valve either the exhaust valve towards its open position. This stem extends slideable through guiding openings in the valves and in either one of two directions is able to come to rest with a stepped shoulder portion against one of the respective valves such that it can push that valve in that direction towards its open position. A piston-cylinder system is provided which at one side of its piston connects to the inlet port via an adjustable proportional regulator, and on the other side of its piston connects to the outlet port via a fluid passage. The adjustable proportional regulator is designed to output a pilot pressure in response to a control signal. The piston then is movable in response to a pressure differential between the inlet port and the outlet port. The piston is connected to the stem and thus is able to move the valves in one of three positions, that is to say one in which both valves are closed, one in which only the supply valve is opened, and one in which only the exhaust valve is opened.

A disadvantage with this is that the functioning of the booster valve mechanism leaves to be desired. It's construction is rather complex. Also a proper functioning of the booster valve mechanism cannot be guaranteed, for example because wear may occur between the stem and the guiding openings in the valves. This may lead to small abraded particles which are free to wander through the valve and for example may get stuck between sealing rings of the valves and complementary opposing seats for them. This then may lead to leakages starting to occur, particularly because the valves are pressure balanced and only have a spring urging them towards closed positions. The likelihood of such wear to start to occur between the stem and the valves is even enlarged because of the fact that the stem is directly or indirectly guided at a plurality of points. Not only is the stem guided slideable through the guiding openings in the supply and exhaust valves themselves, but also with a lower stem end within a separate distinctive guiding sleeve which is fixedly connected to the housing. Furthermore a sealing ring of the piston of the piston-cylinder system guides the stem slideable within the housing. Over a period of time this can cause a relative high friction for the piston, stem and valves to start moving. This high friction in return may lead to hysteresis and to a slower response time for the booster valve mechanism to react on a changing pilot pressure which is delivered in response to a control signal. This particularly is the case when the booster valve mechanism needs to be used under harsh conditions, like low temperatures which make the various sealing rings and guiding organs stiffer.

Another example of such a three-position booster valve mechanism is known from U.S. Pat. No. 8,205,632. Like the abovementioned booster valve mechanism, this known valve mechanism also has an inlet, outlet and exhaust port, and a piston-cylinder operated stepped stem which has shoulders for interaction with supply and exhaust valves to be moveable up and down. The piston-cylinder control system again is mounted on top of the housing at a position above the supply and exhaust valves. The stem is connected to the piston and extends downwardly therefrom through a guiding opening in the housing, through a guiding opening in the exhaust valve and through a guiding opening in the supply valve. Between each of those guiding openings and the stem, annular clearances are provided which are destined to form so-called fluid leak paths for operating air, so that pressure on both sides of the supply and exhaust valves is substantially balanced and so that a pressure present at the outlet port also gets exerted to a lower side of the piston. At its upper side the piston cylinder system is connected to a pilot port. The piston-cylinder system thus can move the stem and the valves in response to a difference between a pilot signal coming from the pilot port and the air pressure in the outlet port.

This booster valve mechanism as known from U.S. Pat. No. 8,205,632 substantially has the same disadvantages as the one of EP 1 255 044, that is to say its functioning leaves to be desired, and it's construction is rather complex, while a proper leakage-free functioning cannot be guaranteed. With this, wear between the valves and the stem is even more likely to occur because of the substantial amount of play between the stem and the guiding openings which are necessary for forming the fluid leak paths. This may lead to the stem starting to tilt or slant somewhat within one or more of the guiding openings, which may lead to a large degree of abrasion and to a relative high friction for the stem and valves to move relative to each other inside the housing.

The present invention aims to overcome the abovementioned disadvantages at least partly or to provide a usable alternative. In particular the invention aims to provide a safe and reliable three-position booster valve mechanism which is less susceptible to wear.

SUMMARY OF THE INVENTION

This aim is achieved by a three-position booster valve mechanism according to the present invention. The valve mechanism comprises a housing having an inlet port, an outlet port and an exhaust port. A supply passage extends between the inlet port and the outlet port. An exhaust passage extends between the outlet port and the exhaust port. A supply valve is provided in the supply passage and is operable between a closed and an open position. The supply valve is biased by a spring towards the closed position in which it closes the supply passage. An exhaust valve is provided in the exhaust passage and is operable between a closed and an open position. The exhaust valve is biased by a spring towards the closed position in which it closes the exhaust passage. An operating member is provided for moving the supply valve and the exhaust valve between their open and closed positions. An operable piston-cylinder control system is provided for moving the operating member between a first position in which the supply valve and the exhaust valve are closed, a second position in which the supply valve is open and the exhaust valve is closed, and a third position in which the supply valve is closed and the exhaust valve is open. Furthermore a pilot port is provided which connects to the piston-cylinder control system for moving the operating member in between the first, second and third positions in dependence of a pilot pressure delivered to the pilot port. The piston-cylinder control system at its side opposite the side which connects to the pilot port, is provided with a first medium passage which connects to the outlet port. According to the inventive thought the piston-cylinder control system connects to the operating member at a central point of application in between the supply valve and the exhaust valve. The operating member extends in opposing directions from this central point of application towards the supply valve and the exhaust valve.

Owing to the invention it is no longer necessary to have the operating member extend through one or both of the supply and exhaust valves. This makes it possible to limit friction between the operating member and the valves, which makes a fast response time possible for the booster valve to react on a changing pilot pressure which is delivered to the pilot port in response to a control signal. Furthermore it makes it possible to reduce wear between the operating member and the valves during relative movements thereof. This may help to reduce abrasion, which in turn may help to prevent leakages to occur. Further it is noted that the central positioning of the operating member in between the two valves, makes it possible to keep the length of the operating member and the forces for operating it limited.

It is noted that U.S. Pat. No. 2,630,828, U.S. Pat. No. 2,924,200, CA 2 537 862 and WO 85/03556 disclose valve constructions with pistons that lie in between two valve bodies. Those known valve construction however do not relate to three-position booster valve mechanisms, but to entirely different types of valve constructions.

The supply valve, the exhaust valve, the operating member and the piston-cylinder control system according to the present invention preferably are positioned such relative to each other that they have a common axial direction along which they are reciprocally moveable. The piston-cylinder control system and the operating member then advantageously both can be positioned centrally in between the supply and exhaust valves along this axial direction. This makes it for example possible to prevent moment forces to occur between them.

In a preferred embodiment the operating member is guided and kept centred by means of suitable slide bearings in the housing at opposing sides of its central point of application. Those slide bearings can be provided in parts of the housing parts that lie in between the supply and exhaust valves. Thus the piston of the piston-cylinder control system is able to get sealingly displaced back and forth inside the cylinder, without having to play a guiding or centring role for the operating member.

The operating member can have the valves move in various manners. For example the operating member can still be provided with stepped shoulder parts which are destined to exert pulling forces onto the valves. In a preferred embodiment however the operating member is designed to exert axially directed pushing forces onto the valves, in particular with axial end faces of its outer ends. With this it is possible to have those outer ends of the operating member partly grip into complementary holes which are provided in the valves. It is also possible to just have them exert pushing forces onto front faces of the valves. At least it is then no longer necessary to have the operating member extend through the entire valves. Advantageously, in the first position, in which both valves are to remain in closed positions, interspacings can be present between the outer ends of the operating member and the valves. When moved from this first position towards either the second either the third position, one of the outer ends of the operating member then can come to lie abutting against its respective valve and start pushing this valve towards its open position. This has the positive effect that in the first position there does not have to be contact between the operating member and the valves. Thus in this first position no wear can start to occur between the operating member and the valves. Preferably this interspacing is sufficiently large, and in particular gets to lie within a range of 0.5-1.0 mm, that tolerances and deformations of the various valve parts do not have to lead to the operating member and the valves all of a sudden coming to lie against each other in the first position.

The operating member can have all kinds of shapes, but preferably is formed by an elongate slender stem which is connected with a central portion to a piston of the piston-cylinder control system. Outer ends of this stem then can reciprocally engage with their respective valve during a shifting movement from the first towards the second or third position.

In an embodiment connecting parts of the supply and exhaust passages may connect to each other sideways of a common central axis of the valves and piston-cylinder control system. In contrast to the above mentioned known booster valves, the stem does not have to extend through either of the two valves and both inlet and exhaust valves can be identical. Space is now available for the piston-cylinder control system to be properly placed in between the valves.

In a further embodiment the sideways extending connecting parts of the supply and exhaust passages connect to the outlet port at one eccentric position sideways of the piston-cylinder system. This may help to keep the construction of the three-position booster valve mechanism relative compact and/or simple.

In an even further embodiment the housing may comprise a releasable manifold which at least partly delimits the connecting parts of the supply and exhaust passages as well as the outlet port. This makes it possible to install differing types of manifolds depending of the type of control and amount/rate of exhaust that is desired. For example the outlet port then can be provided at an eccentric position on the manifold. This may make it possible to install the manifold in two positions, one in which the supply passage is relative long and one in which the exhaust passage is relative long.

Further embodiments are described herein.

BRIEF DESCRIPTION OF THE DRAWINGS

The invention shall be explained in more detail below with reference to the accompanying drawings, in which.

DETAILED DESCRIPTION OF THE INVENTION

Figure 1:
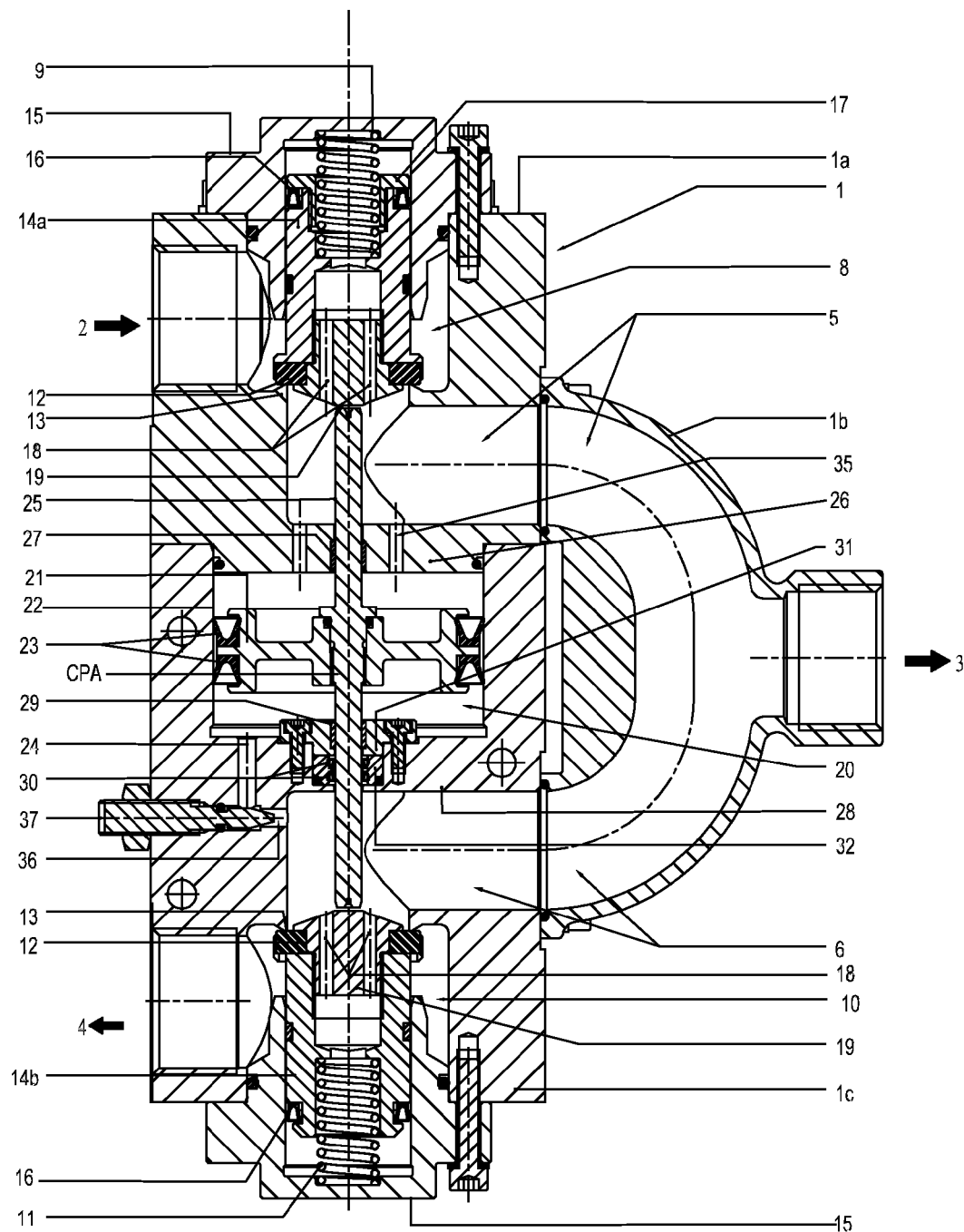
FIG. 1 shows a cross sectional front view of a first embodiment of a three-position booster valve mechanism with lip seals according to the invention in a first position with closed inlet and exhaust ports.

In FIG. 1-4 the three-position booster valve mechanism comprises a housing which has been given the reference numeral 1. The housing 1 comprises an inlet port 2, an outlet port 3 and an exhaust port 4. A supply passage 5 extends between the inlet port 2 and the outlet port 3. An exhaust passage 6 extends between the outlet port 3 and the exhaust port 4. The housing 1 mainly comprises an inlet block 1a, an outlet manifold 1b and an exhaust block 1c which are connected releasable and sealing to each other and through which the passages 5 and 6 extend.

Figure 2:
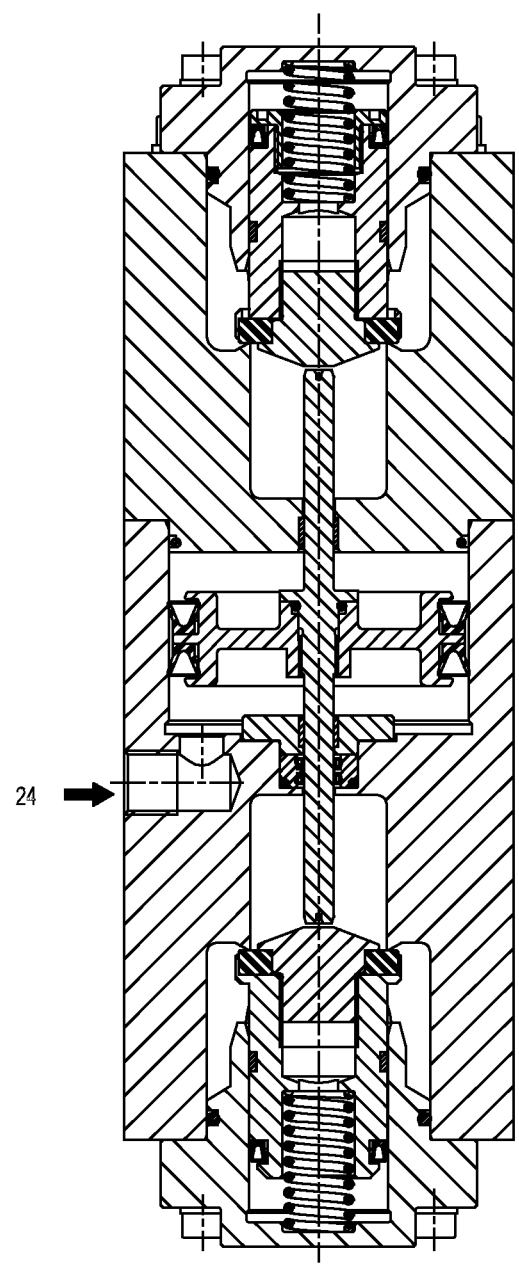
FIG. 2 shows a cross sectional side view of FIG. 1.

The inlet block 1a comprises a supply valve 8 which in FIG. 1 is biased by a spring 9 towards a position in which it closes the supply passage 5. The exhaust block 1c comprises an exhaust valve 10 which in FIG. 1-2 is biased by a spring 11 towards a position in which it closes the exhaust passage 6. The valves 8, 10 have a common central axis Ax along which they are axially moveable outwards into open positions as shown respectively in FIGS. 3 and 4, and back inwards again into the closed positions as shown in FIG. 1-2.

The valves 8, 10 each comprise a sealing disc 12 which in their closed positions lie sealing against complementary seats 13 provided in the housing 1. Furthermore the valves 8, 10 each comprise a piston-forming back valve part 14a, b which are axially moveably guided inside cylinder-forming cap ends 15. Dynamic lip seals 16 are active in between the back valve parts 14 and the cap ends 15. The back valve part 14a of the supply valve 8 is provided with a cap screw 17 to mount the lip seal 16 on the supply valve 8.

The valves 8, 10 are substantially pressure balanced owing to channels 18 which are provided in mushroom shaped front valve parts 19. The channels 18 connect at front sides to parts of the supply and exhaust passages 5, 6 which lie at the side of the outlet port 3. At their back sides the channels 18 connect to back faces of the valves 8, 10. Thus a pressure which is present inside the passages 5, 6 is exerted onto both front faces as well as to back faces of the valves 8, 10.

The supply and exhaust passages 5, 6 extend meandering around a centre part of the housing 1. In particular the manifold 1b delimits a Y-shaped passage which in a centre part connects the passages 5, 6 to the outlet port 3. Owing to the symmetrical shape of the manifold 1b, a flow capacity of the supply here is equal to the one of the exhaust.

In a centre part of the housing 1, a piston-cylinder control system 20 is provided. The control system 20 comprises a piston 21 which is axially moveably guided inside a cylinder 22 of the exhaust block 1c. Two oppositely directed dynamic lip seals 23 are active in between the piston 21 and the cylinder 22. A lower side of the cylinder 22 is connected to a pilot port 24.

A stem 25 is provided which extends in the axial direction Ax in between the valves 8, 10. The stem 25 is fixedly connected at a central point of application CPA to the piston 21. This central point of application here lies in the middle of the stem 25 (seen in the axial direction Ax) in between its outer free ends. Thus the stem 25 extends in opposing directions from said middle point towards the supply valve 8 and the exhaust valve 10. The stem 25 has an axial length which is shorter than an axial distance between the front faces of the valves 8, 10 in their mutually closed position, such that small clearances of for example between 0.5-1.5 mm remain between outer ends of the stem 25 and the valves 8, 10 in this mutually closed position.

The cylinder 22 is delimited inside the housing 1 between the inlet block 1a and the exhaust block 1c, here the cylinder 22 is an integral part of the housing 1. Owing to the releasable connection between the blocks 1a and 1c, the piston 21 can easily be placed inside the cylinder 22.

A wall part 26 of the housing 1 which extends between the supply passage 5 and the cylinder 22 is provided with an upper guiding opening for the stem 25. The upper guiding opening is equipped with a slide bearing 27 such that the stem 25 can easily slide up and down in the axial direction Ax through it. A wall part 28 of the housing 1 which extends between the exhaust passage 6 and the cylinder 22 is provided with a lower guiding opening for the stem 25. The lower guiding opening is equipped with a slide bearing 29 such that the stem 25 can easily slide up and down in the axial direction Ax through it. Two oppositely directed dynamic lip seals 30 are active in between the stem 25 and the lower guiding opening. an upper retainer 31 and a lower retainer 32 keep the slide bearing 29 and the seals 30 in place. An O-ring below the lower retainer 32 seals it in the exhaust block 1c. Thus the assembly of the piston 21 and stem 25 is axially moveably guided at only two points. The slide bearings 27, 29 can for example be formed by plastic bushes which are able to deal with temperatures ranging between −60 degrees Celsius and +90 degrees Celsius.

An upper side of the cylinder 22 is connected by first medium passages 35 to the parts of the supply and exhaust passages 5, 6 which lie at the side of the outlet port 3. Thus a pressure which is present inside the passages 5, 6 can be exerted onto a top face of the piston 21. Besides being connected to the pilot port 24, the lower side of the cylinder 22 is connected by a second medium passage 36 to the same parts of the supply and exhaust passages 5, 6 which lie at the side of the outlet port 3. An adjustable screw 37 is provided as restriction inside this second medium passage 36. Thus the pressurized medium which is present inside the passages 5, 6 can slowly flow into the lower side of the cylinder 22, depending on the amount of restriction which is set by the screw 37. A nut 38 will lock the screw 37 in its position.

Figure 3:
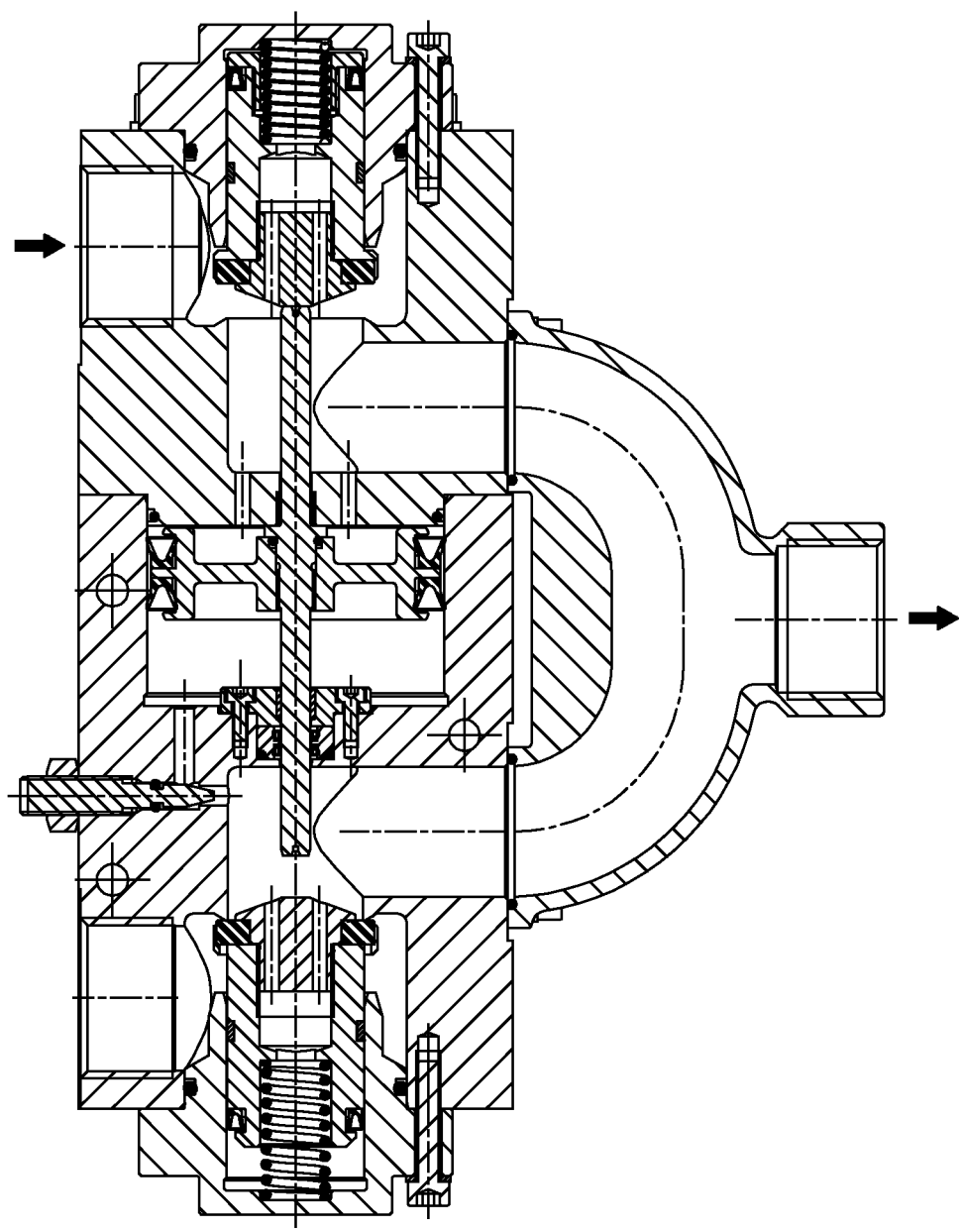
FIG. 3 is a view according to FIG. 1 in a second position with open inlet and closed exhaust ports.

The three-position booster valve mechanism can now be operated as follows:

A pressurized medium, for example a gas like air, can be supplied at a pressure Pin to the inlet port 2. If, starting from the first position as shown in FIG. 1-2 in which both valves 8, 10 are closed, the pilot port 24 is pressurized with a pressurized medium, for example a gas like air, at a pressure Ppilot, then the cylinder 22 gets filled below the piston 21, and the piston 21 moves upwards. With this the stem 25 pushes the supply valve 8 open. Thus the second position as shown in FIG. 3 is obtained. Medium then starts to flow from the inlet port 2 to the outlet port 3. Components coupled to the outlet port 3, like for example a large valve positioner in a pipeline, then will be pressurized/operated.

Since the area above the piston 21 is open to the outlet port 3, the area above the piston 21 gets pressurized at the pressure Pout which is substantially the same as Pin.

As soon as Pout gets to be equal to Ppilot, there is a balance, the stem 25 moves back to the first position again, and there is no force exerted by the stem 25 on the inlet and exhaust valves 8, 10. The inlet valve 8 then closes again under the influence of its spring 9, whereas the exhaust valve 10 stays closed. Thus the first position as shown in FIG. 1-2 is obtained again.

Figure 4:
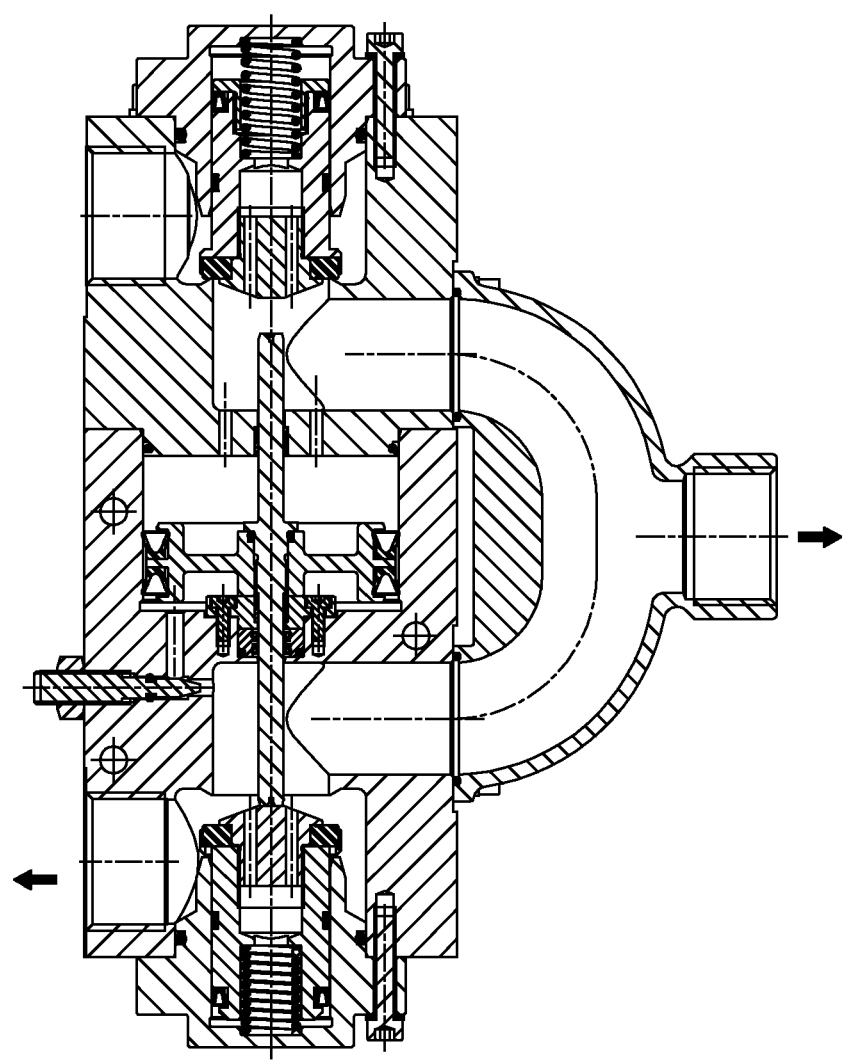
FIG. 4 is a view according to FIG. 1 in a third position with closed inlet and open exhaust port.
Figure 5:
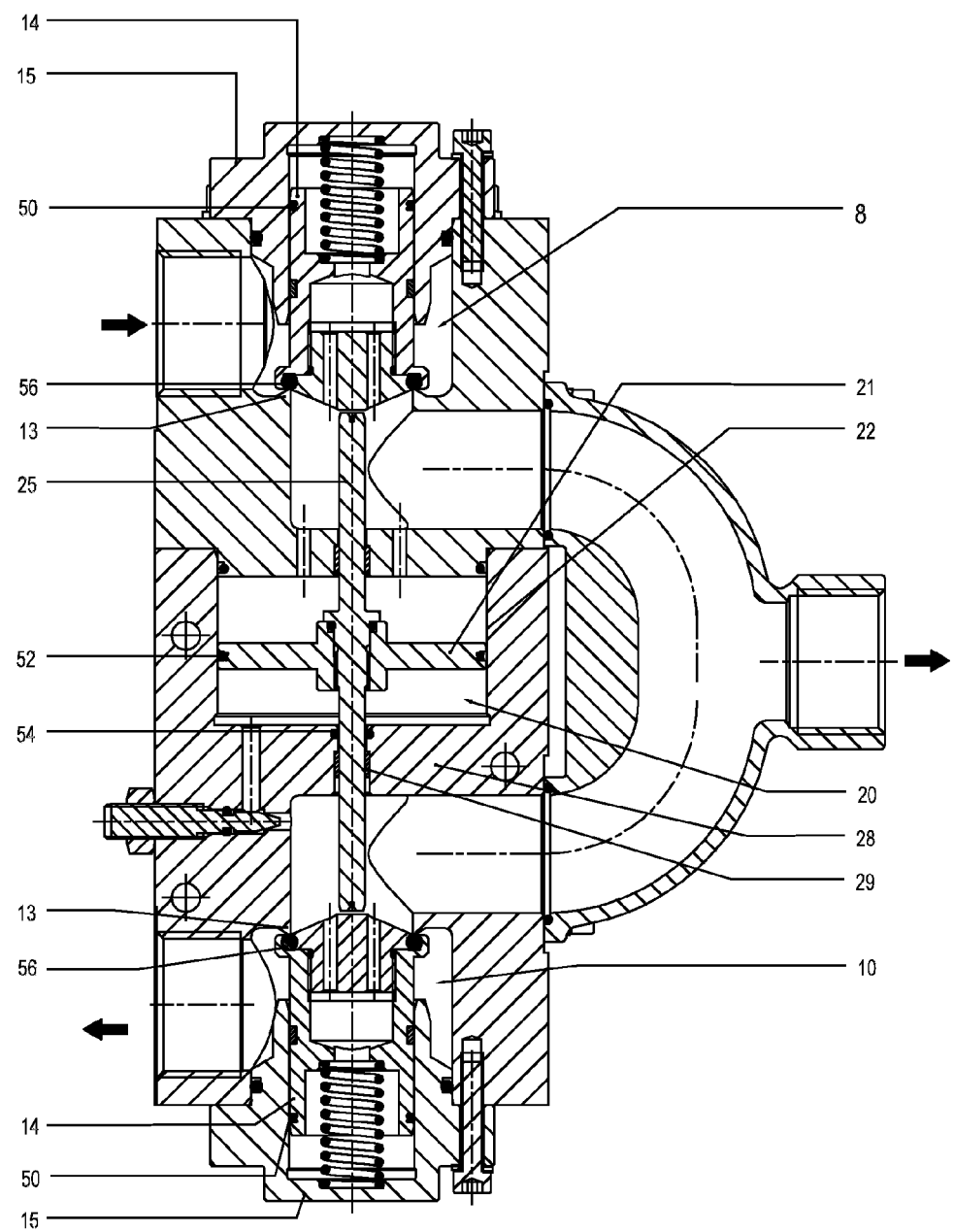
FIGS. 5-8 show views according to FIG. 1-4 of a second embodiment with O-ring and X-ring seals.
Figure 6:
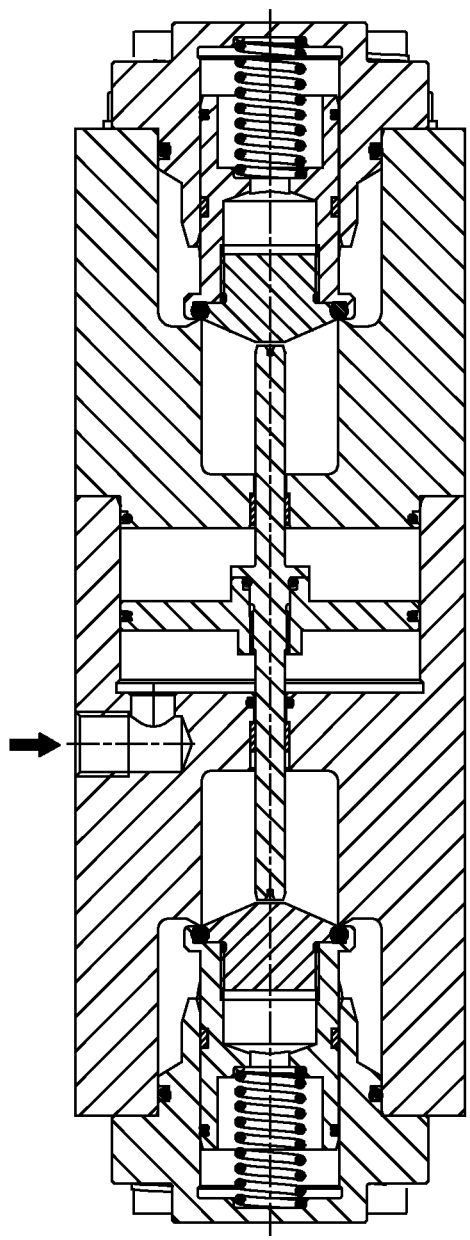
Figure 7:
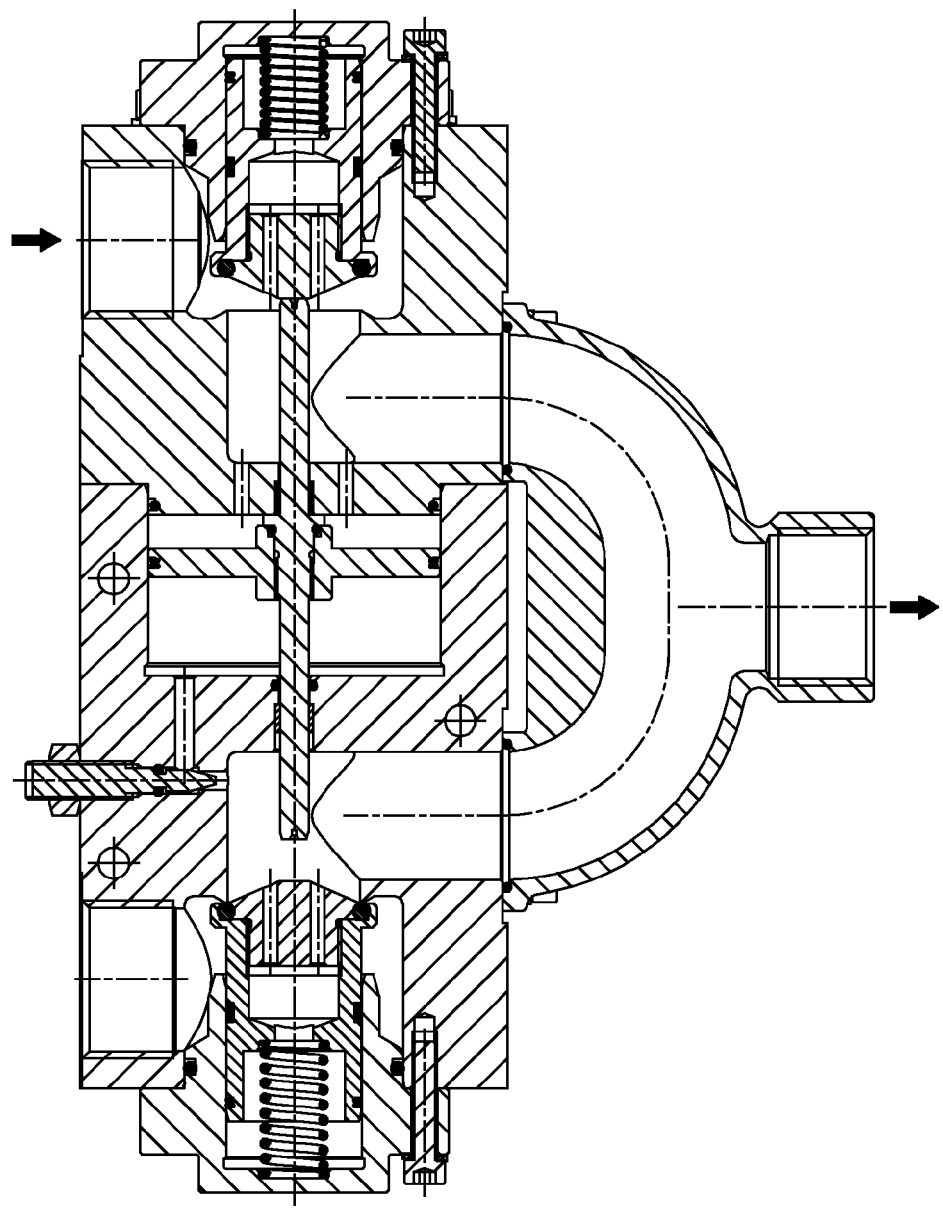
Figure 8:
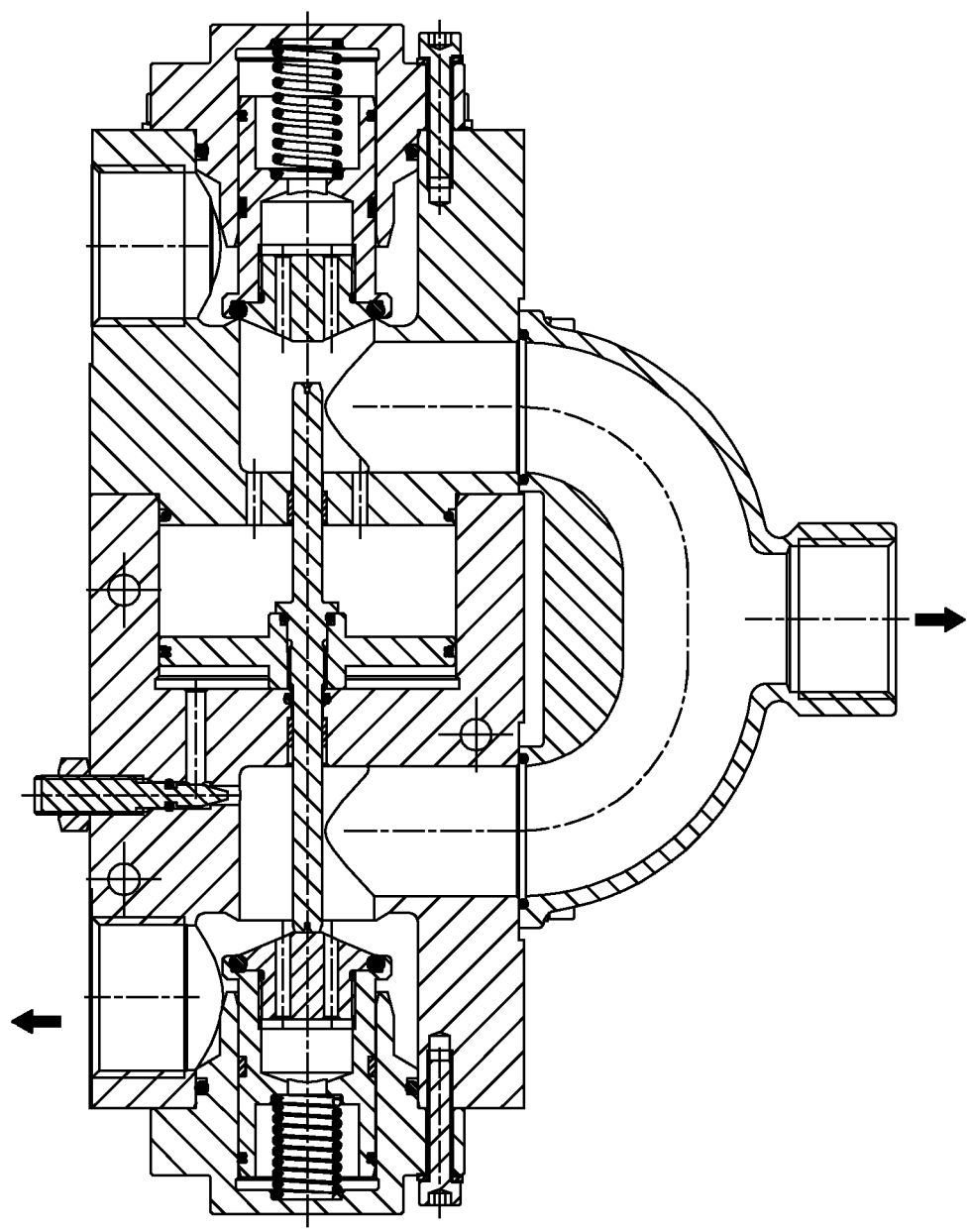

If, starting from the first position as shown in FIG. 1-2 in which both valves 8, 10 are closed, while the outlet port 3 is pressurized, the pilot port 24 is de-pressurized, then the cylinder 22 below the piston 21 gets emptied and the piston 21 moves downwards, as a result of the pressure Pout above the piston 21. The stem 25 then pushes the exhaust valve 10 open. Thus the third position as shown in FIG. 4 is obtained. Medium then starts to flow from the outlet port 3 to the exhaust port 4. Components coupled to the outlet port 3, like for example the large valve positioner in the pipeline, then will be de-pressurized/operated.

As soon as Pout gets to be equal to Ppilot again, there is a balance, the stem 25 moves back to the first position again, and there is no force exerted by the stem 25 on the inlet and exhaust valves 8, 10. The exhaust valve 10 then closes again under the influence of its spring 11, whereas the inlet valve 8 stays closed. Thus the first position as shown in FIG. 1-2 is obtained again.

If the pilot port 24 is not pressurized, the supply valve 8 is closed or will be closed, and the exhaust valve 10 will be opened to de-pressurize the outlet. After de-pressurization has completed, the exhaust valve 10 will be automatically closed. This can be used as a safety measure.

Owing to the fact that both the supply and exhaust valves 8, 10 are pressure balanced, a very low force is needed to open them. With only a small increase or decrease of the pilot pressure, the supply valve 8 or the exhaust valve 10 can already be opened.

The second medium passage 36 serves as a bypass for the piston 21, that is to say a bypass between Ppilot and Pout. A flow through this bypass, results in a certain bleed which may limit overshoot of the outlet pressure Pout and thus may help to limit peak forces. In general it can be used to affect a reaction (curve) of the control valve.

The lip seals 16, 23, 30 and sealing discs 12 of this first embodiment are designed such that they are able to deal with relative low temperature ranges of between −60° C. to +60° C. The lip seals 16, 23, 30 for example can be made of a suitable PU, possibly with a metal spring organ integrated therein for biasing their lips towards their sealed positions against walls of the back valve parts 14 and cap ends 15, of the piston 21 and cylinder 22, respectively of the stem 25 and retainer 32. PU offers the advantage that it is able to offer good resistance against dirt and pollution that may be present inside the pressurized media flowing through the control valve The use of such flexible lip seals offers the advantage that they are well able to perform their sealing capacities even at low temperatures. Furthermore they do not start rolling inside their chambers when moving back and forth relative to walls of the cap ends 15 and cylinder 22. They only perform sliding movements and thus may have a long lifespan and maintain good sealing capacities.

In FIG. 5-8 a second embodiment is shown. Similar or same components have been given the same reference numerals. The main differences with the above mentioned first embodiment are that:

instead of the lip seals 16, here use is being made of X-ring seals 50 between the respective back valve parts 14 and cap ends 15 of the valves 8, 10;

instead of the lip seals 23, here use is being made of an X-ring seal 52 between the piston 21 and the cylinder 22 of the piston-cylinder control system 20;

instead of the lip seals 30, here use is being made of an X-ring seal 54 between the stem 25 and the lower guiding opening in the wall part 28; and instead of the sealing discs 12, here use is being made of O-ring seals 56 between the valves 8, 10 and their seats 13.

The X-ring seals 50, 52, 54 and O-ring seals 56 of this second embodiment are designed such that they are able to deal with temperature ranges of between −20° C. to +90° C. The X-ring seals 50, 52, 54 offer the advantage that they can be placed in their chambers by means of slight deformation. Owing to this the valves 8, 10 no longer need to be equipped with distinctive retainer organs on their back valve parts 14, whereas the retainer 31 can be dispensed with. The X-ring seals 50, 52, 54 for example can be made of a suitable FPM. This is cost saving compared to the spring metal reinforced PU lip seals. The X-shape offers flexibility which helps to keep its outer ends in their respective sealed positions Like the lip seals of the first embodiment, the X-ring seals 50, 52, 54 offer the advantage that they do not start rolling inside their chambers when moving back and forth relative to the walls of the cap ends 15 and the cylinder 22. They only perform sliding movements and thus may have a long lifespan and good sealing capacities.

Figure 9:
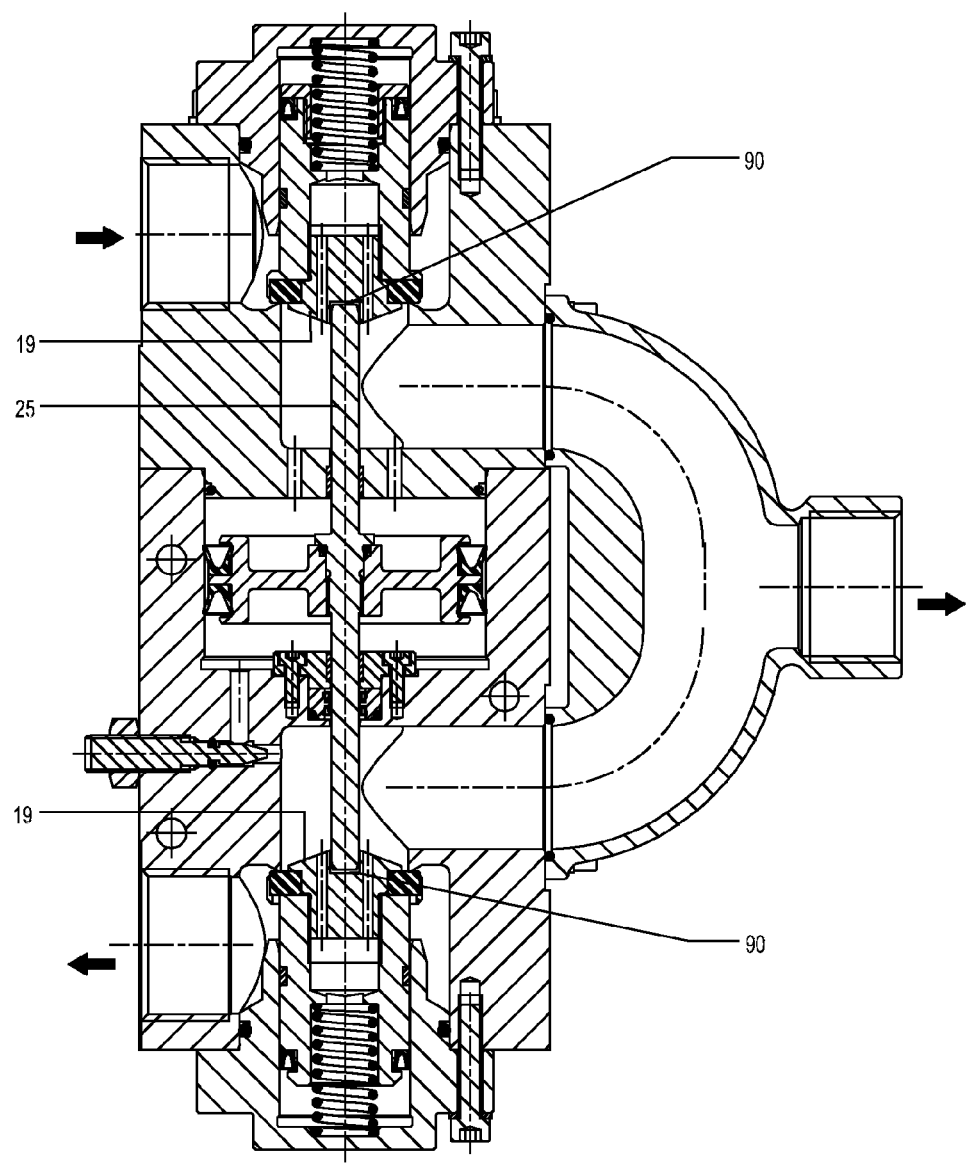
FIG. 9 shows a view according to FIG. 1 of a third embodiment with stem and valves partly gripping into each other.

In FIG. 9 a third embodiment is shown which again is largely similar to the first embodiment. Here the front valve parts 19 are provided with blind holes 90 into which free outer ends of the stem 25 grip with circumferential play. The contact point is moved to a location beyond the valve seat. This may further help to keep the valves 8, 10 more stable during their movements.

Figure 10:
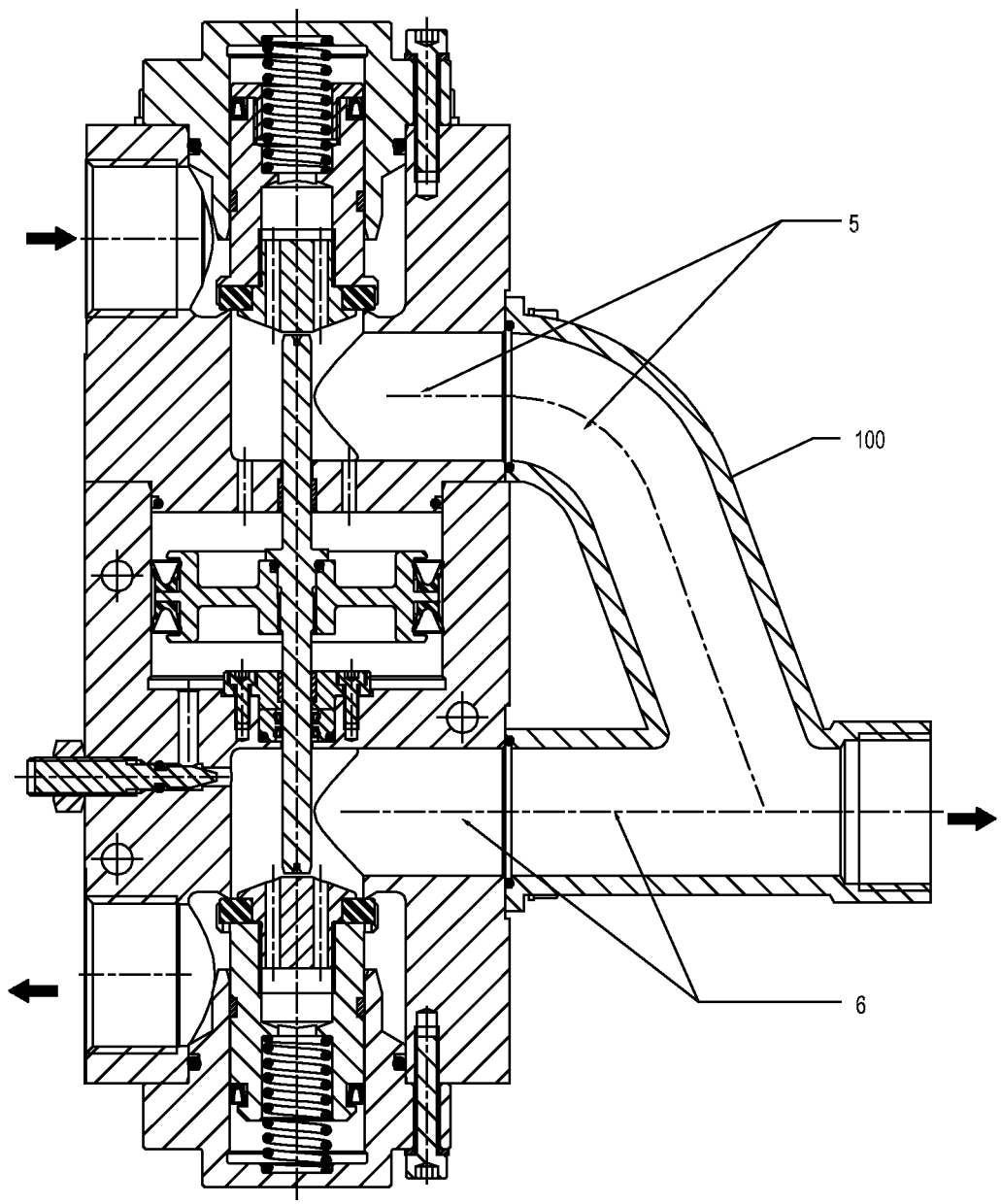
FIGS. 10 and 11 show views according to FIG. 1 of a fourth embodiment with an eccentric outlet manifold.
Figure 11:
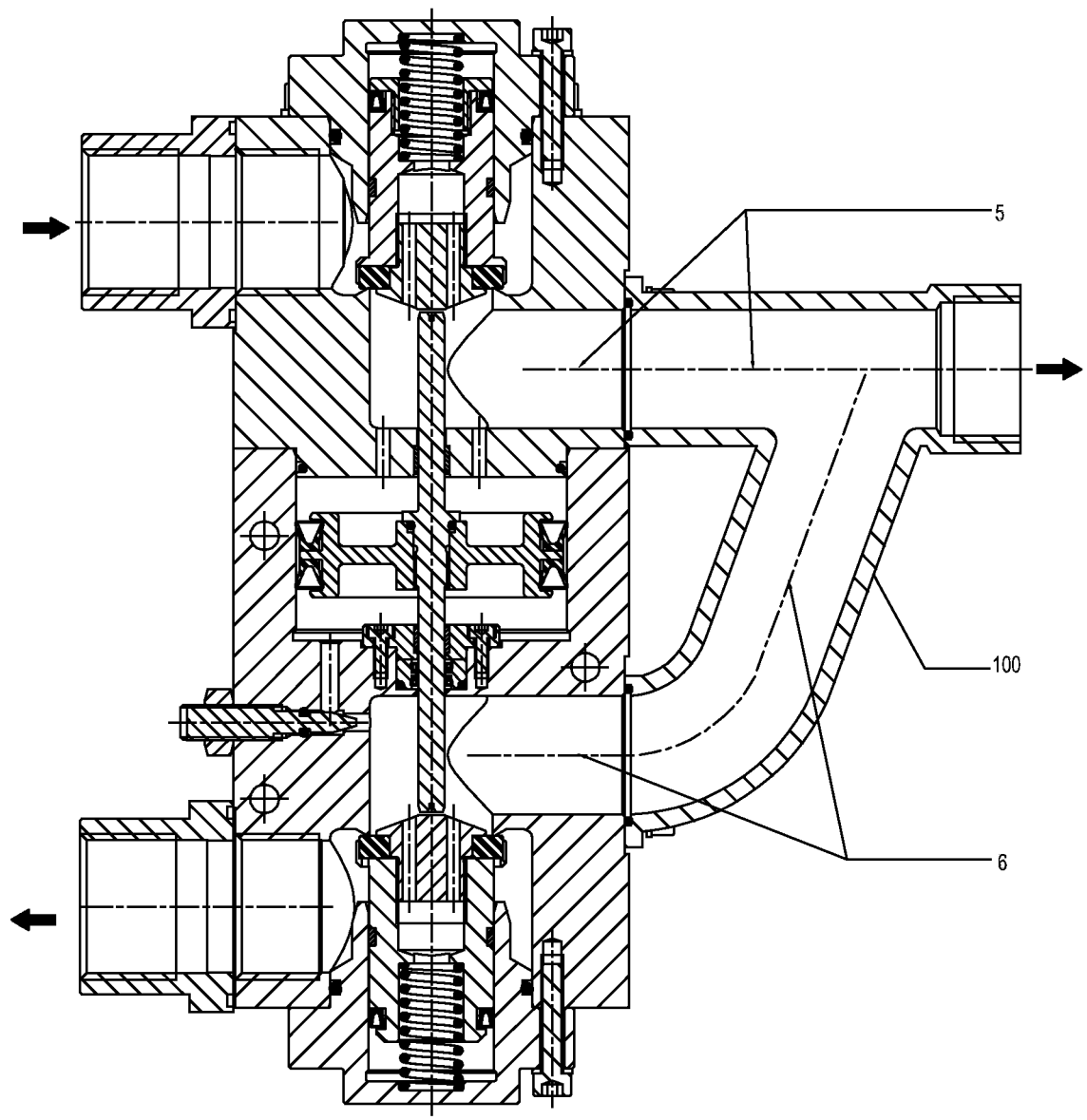
Figure 12:
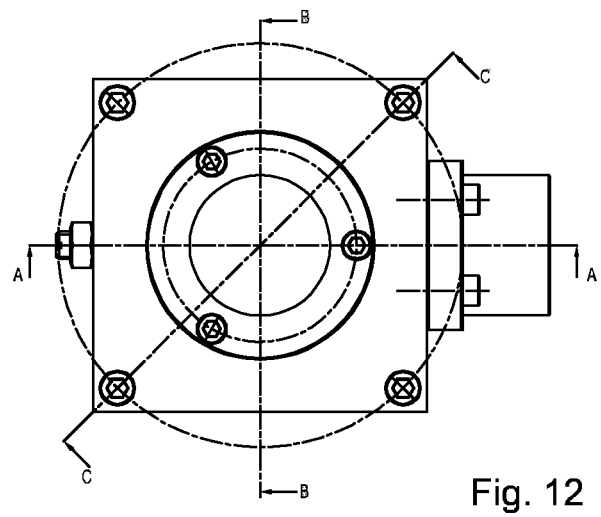
FIGS. 12-15 show a top view and cross sectional views over the lines A-A, B-B and C-C of a fifth embodiment with supply and exhaust passages no longer forming part of an external outlet manifold.
Figure 13:
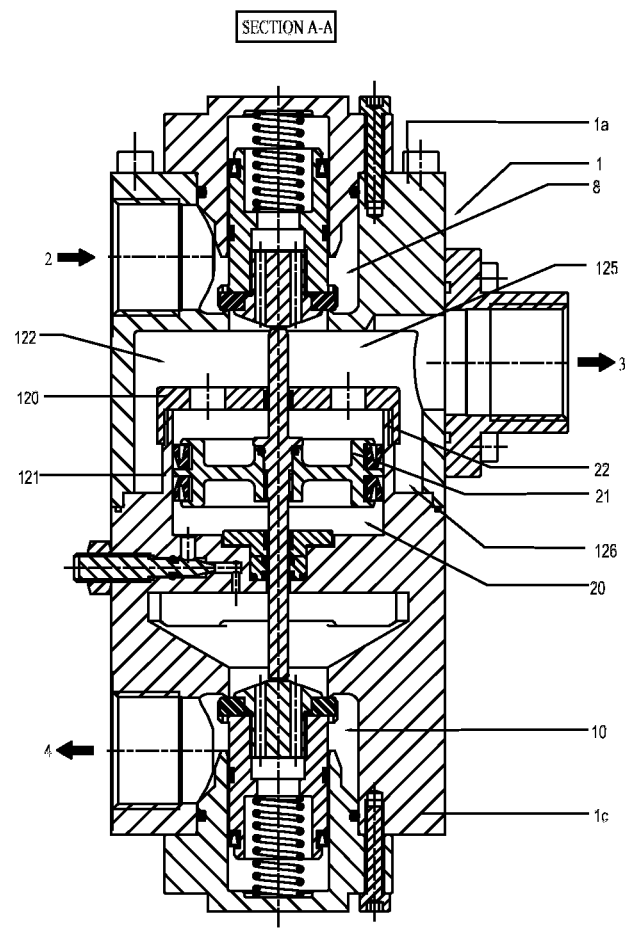
Figure 14:
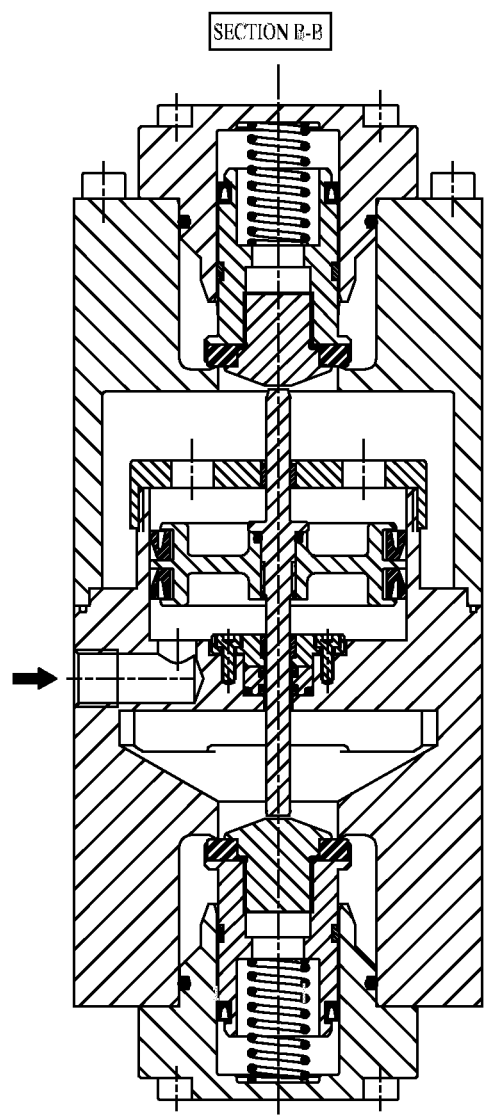
Figure 15:
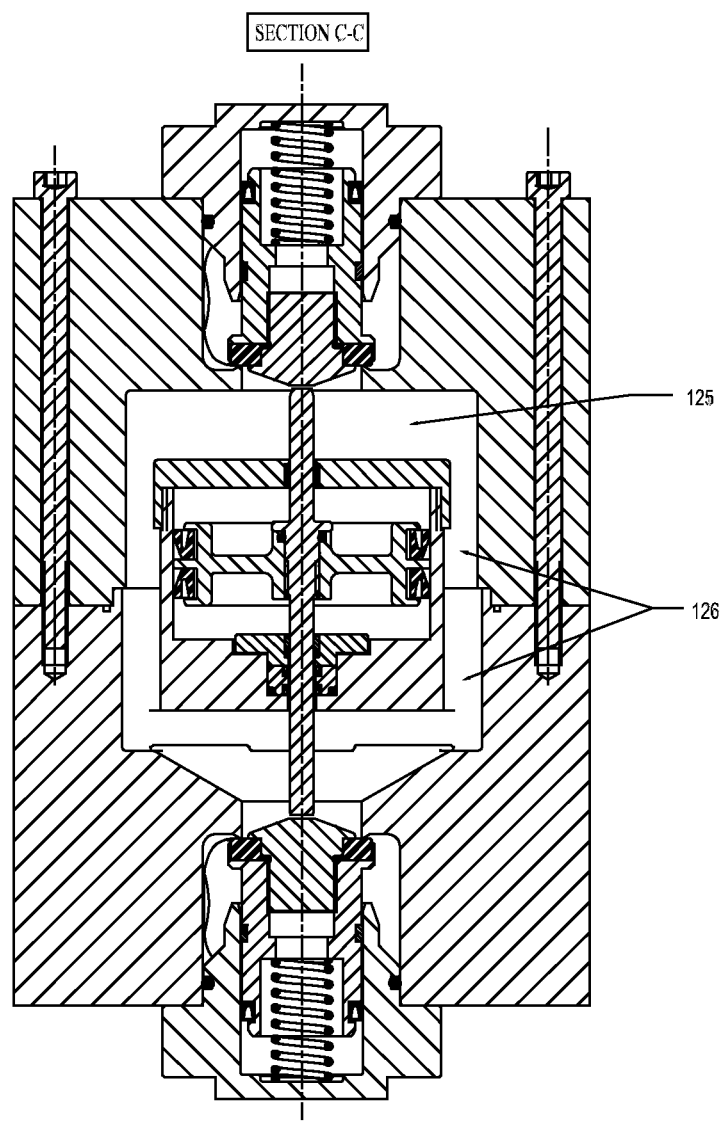

In FIG. 10-11 a fourth embodiment is shown in which the symmetrical manifold 1*b* of FIG. 1 has been replaced by an eccentric outlet manifold 100. This makes it possible to place the manifold 100 in two differing positions making either the exhaust passage 6 shorter (FIG. 10) either the supply passage 5 shorter (FIG. 11). A shorter passage meaning a higher flow capacity.

FIG. 12-15 show a fifth embodiment which is partly similar to the first embodiment. Here the piston-cylinder control system 20 at its upper side is delimited by a distinctive cap 120. This cap 120 is placed on top of an upwardly projecting wall 121 of the exhaust block 1*c* which forms the cylinder 22 inside which the piston 21 is moveable. Around the cap 120 and wall 121, a flowing space/channels 122 is provided within the housing 1. This flowing space/channels 122 at its upper side forms a supply passage 125 which extends between the inlet port 2 and the outlet port 3, and at its lower side forms an exhaust passage 126 which extends between the outlet port 3 and the exhaust port 4. Thus the entire passages 125, 126 lie within the inlet block 1*a* and exhaust block 1*c* of the housing 1, while the piston-cylinder control system 20 still lies centrally in between the two valves 8, 10 to be operated.

Besides the embodiments shown numerous variants are possible. For example the various shapes and dimensions can be varied. Instead of the piston-cylinder control system lying at the same central axis Ax and/or in between the supply and exhaust valves, it is also possible to have it positioned at another position inside or even outside the housing, as long as it keeps to connect to the stem at a central point of application in between the supply valve and the exhaust valve. The lip seals can be made out of PU, PTFE, HDPE or the like and can be spring loaded such that they are well able to take back or maintain their original shape during temperature changes. Instead of dynamic lip seals or X-ring seals, it is also possible to use other types of sealing organs like O-rings.

Thus according to the invention a three-position booster valve mechanism is obtained which in particular can be used as a booster valve with a high flow capacity and which, owing to its accurate control function, for example can also be used for partial stroke testing.

The invention claimed is:

1. A three-position booster valve mechanism comprising:
 a housing having an inlet port, an outlet port and an exhaust port;
 a supply passage extending between the inlet port and the outlet port;
 an exhaust passage extending between the outlet port and the exhaust port;
 a supply valve provided in the supply passage and operable between a closed and an open position, in which the supply valve is biased by a spring towards the closed position in which it closes the supply passage;
 an exhaust valve provided in the exhaust passage and operable between a closed and an open position, in which the exhaust valve is biased by a spring towards the closed position in which it closes the exhaust passage;
 an operating member for moving the supply valve and the exhaust valve from their closed towards their open positions;
 an operable piston-cylinder control system for moving the operating member between a first position in which the supply valve and the exhaust valve are closed, a second position in which the supply valve is open and the exhaust valve is closed, and a third position in which the supply valve is closed and the exhaust valve is open; and
 a pilot port which connects to one side of the piston-cylinder control system for moving the operating member in between the first, second and third positions in dependence of a pilot pressure delivered to the pilot port,
 wherein the piston-cylinder control system at its side opposite the side which connects to the pilot port, is provided with a first medium passage which connects to the outlet port, and
 wherein the piston-cylinder control system connects to the operating member at a central point of application in between the supply valve and the exhaust valve, the operating member extending in opposing directions from said central point of application towards the supply valve and the exhaust valve.

2. A three-position booster valve mechanism according to claim 1, wherein the supply valve, the exhaust valve, the operating member and the piston-cylinder control system have a common axial direction along which they are reciprocally moveable, and wherein the piston-cylinder control system and the operating member are positioned centrally in between the supply and exhaust valves along this axial direction.

3. The three-position booster valve mechanism according to claim 1, wherein interspacings are present between outer ends of the operating member and the supply valve and the exhaust valve in the first position.

4. The three-position booster valve mechanism according to claim 1, in which wherein the operating member is a stem which is connected to a piston of the piston-cylinder control system, and wherein outer ends of the stem are reciprocally engageable with the supply valve and the exhaust valve respectively.

5. The three-position booster valve mechanism according to claim 1, wherein connecting parts of the supply and exhaust passages extend eccentrically sideways of the piston-cylinder control system.

6. The three-position booster valve mechanism according to claim 5, wherein the connecting parts of the supply and exhaust passages which extend eccentrically sideways of the piston-cylinder control system connect to the outlet port eccentrically sideways of the piston-cylinder control system.

7. The three-position booster valve mechanism according to claim 6, wherein the housing comprises a releasable manifold which delimits the connecting parts of the supply and exhaust passages as well as the outlet port.

8. The three-position booster valve mechanism according to claim 7, wherein the outlet port is provided at an eccentric position on the manifold.

9. The three-position booster valve mechanism according to claim 1, wherein the piston-cylinder control system at its side which connects to the pilot port, is provided with a second medium passage which connects to the outlet port.

10. The three-position booster valve mechanism according to claim 9, wherein the second medium passage is provided with an adjustable restriction, in particular a set screw.

11. The three-position booster valve mechanism according to claim 1, wherein the piston-cylinder control system is provided inside the housing.

12. The three-position booster valve mechanism according to claim 1, wherein the supply and exhaust valves are pressure balanced, in particular by channels connecting to the supply and exhaust passages and extending from front faces of the supply and exhaust valves to back faces thereof.

13. The three-position booster valve mechanism according to claim 1, wherein the operating member does not extend slidable in the axial direction through the entire supply and exhaust valves.

* * * * *